Dec. 6, 1927.
L. A. LAURSEN
1,652,019
VULCANIZING APPARATUS
Original Filed March 20, 1923
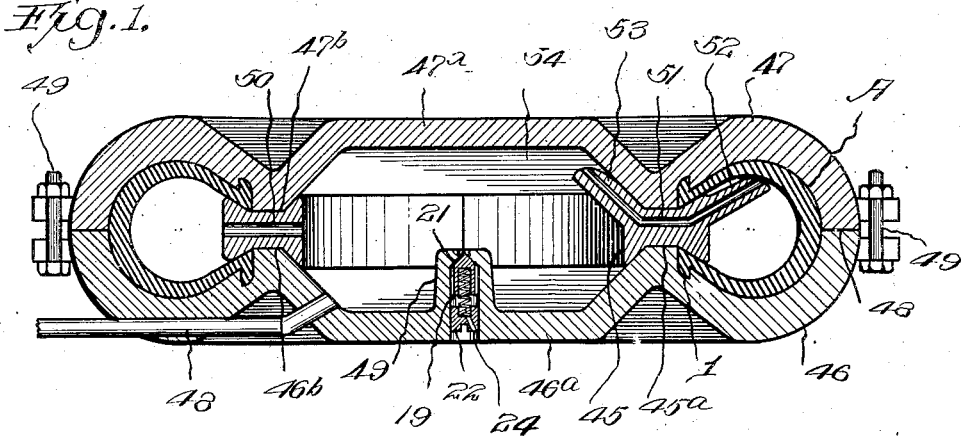
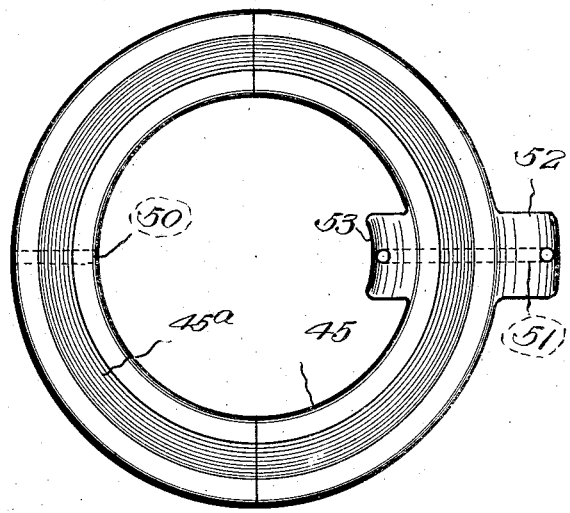
Inventor.
L. A. Laursen
By Robb, Robb & Hill
Attys Patented Dec. 6, 1927.

1,652,019

UNITED STATES PATENT OFFICE.

LAURITS A. LAURSEN, OF AKRON, OHIO.

VULCANIZING APPARATUS.

Application filed March 20, 1923, Serial No. 626,390. Renewed October 24, 1927.

The present invention relates to an apparatus for vulcanizing hollow rubber articles such as the casings for automobile tires.

According to the present invention, fluid pressure is provided and maintained within the rubber article for expanding it into a tight engagement with the interior walls of the mold. The use of fluid pressure results in holding the rubber articles or tire against the walls of the mold with a uniform pressure at every point so that the finished article or tire has no blemishes on the outer face thereof, and the percentage of defective tires or seconds is very small.

Heretofore, it has been customary to employ a bag or hollow tube to receive the fluid where fluid pressure has been used on the interior of the rubber article or tire, and one of the objects of the present invention is to provide a novel construction which will eliminate the necessity of using a bag or tube, and will at the same time provide a leak-proof mold without the necessity of using packing or expensive ground joints. The invention also provides a simple and thoroughly reliable means for maintaining a uniform pressure within the hollow article or tire during the vulcanizing period, and preventing the pressure from increasing and becoming excessive due to the expansion of the confined fluid under the action of the heat which is necessary for vulcanization.

Further objects of the invention are to provide a vulcanizing apparatus of this character which is comparatively simple and inexpensive in its construction, which can be readily assembled and taken apart, and which can be used in the vulcanizer pots or containers which are in common use at the present time.

With the above and other objects in view, the invention consists of certain combinations and arrangements of the parts as will more fully appear as the description proceeds, the novel features thereof being pointed out in the appended claims.

For a full understanding of the invention, reference is to be had to the following description and accompanying drawings, in which:

Figure 1 is a transverse sectional view thru another modified form of the vulcanizing mold.

Figure 2 is a plan view of the bull ring which is used in the mold construction shown by Fig. 1.

Figure 3 is an enlarged sectional view thru the automatic pressure relief valve and associated parts.

Figure 4 is a rear end view of the relief valve itself.

Corresponding and like parts are referred to in the following description and indicated on all of the views of the drawings by like reference characters.

For the purpose of illustration an embodiment of the invention has been shown, which is adapted to be used in the manufacture of rubber tires. These tires are designated by the reference character A, and are adapted to be built up of fabric and rubber compound in accordance with the usual practice in making hollow tires of the pneumatic tire type. The tires may be of any suitable design or desired configuration, and are shown as provided at their edge portions with the usual beads 1. In carrying out the invention some inert liquid such as water is adapted to be introduced into the interior of the tire A, and maintained under a suitable pressure during the period of vulcanization, so that the tire will be expanded and held in a firm and uniform engagement with the interior walls of the mold. As will be hereinafter set forth in detail, the invention embodies novel means for preventing leakage of the water from the mold and also for compensating for the expansion of the water under the action of heat and maintaining a substantially uniform pressure within the tire.

As shown in the drawings, generally speaking, I contemplate the employment of a mold body composed of sections secured together at their outermost portions, and within which the tire is received somewhat after the known manner. Between the sections are clamped the parts of a sectional bull ring acting on the base portion of the tire and through which water is introduced under pressure to enter the space surrounded by the tire to firmly hold the latter in engagement with the mold during the vulcanizing operation. Provisions are made for the removal of the air from the space surrounded by the tire and bull ring, and the latter is so arranged in cooperation with the mold sections, and said sections are so formed, that the liability of leakage of water is obviated.

The detailed construction of the invention will now be set forth.

As shown by Figures 1 and 2, the air which was initially within the tire and mold is compressed within an expansion chamber formed in the mold and utilized as an air cushion, instead of being permitted to escape. The tire A is placed upon a bull ring 45 which is preferably formed in sections, as indicated by Fig. 2. The complemental mold sections 46 and 47 are then applied to the tire and bull ring from opposite sides thereof. At their outer peripheries these mold sections are formed with flat faces which meet at a joint 48 located at the tread portion of the tire A. Any suitable means such as the bolts 49 may be utilized for securing the mold sections together. The bull ring 45 is provided with a substantially radial water passage 50, and also with an air passage 51. This air passage extends thru projections 52 and 53 on the bull ring. The projection 52 extends into the interior of the tire A, while the projection 53 extends into a central chamber 54 provided within the mold, and the two projections 52 and 53 are both deflected laterally in the same direction, so that when the mold is in a horizontal position with the mold section 46 at the bottom thereof, the projection 52 will extend toward the top of the space within the tire A, while the projection 53 will extend toward the top of the central chamber 54.

The mold sections 45 and 47 have dished central portions 46$^a$ and 47$^a$ respectively, which co-operate with each other to form the central chamber 54. At the junction of the dished portions and the tire engaging portions, the mold sections are formed with corresponding inwardly projecting portions 46$^b$ and 47$^b$ respectively, which engage annular depressions 45$^a$ in the sides of the bull ring and co-operate therewith to position the bull ring accurately within the mold.

After being assembled, the mold is adapted to be filled with water, and the construction of the mold is such that leakage of the water is rendered practically impossible. The only joint between the mold sections is the joint 48, and this is located at the tread portion of the tire A, so that there is no possibility of the water escaping at this joint. As has been previously explained, it is practically impossible to prevent leakage of the water between the mold sections and the bull ring when the rubber of the tire is softened under the heat of vulcanization, although with the present construction any water which might circulate between the mold sections and the bull ring would merely enter the central chamber 54, and owing to the fact that the pressure within this chamber is the same as the pressure in other parts of the mold, any tendency of the water to pass between the mold sections and bull ring is counteracted.

A water supply pipe 48 extends thru the walls of the dished portion 46$^a$ of the mold section 46, and after the mold has been assembled and placed in a horizontal position with the mold section 46 at the bottom thereof, water is forced or pumped into the mold thru this pipe 48. As the water fills the mold the air will be trapped and compressed in the upper portion of the central chamber 54. The air which was confined within the interior of the tire A will escape thru the air passage 51 of the bull ring into the central chamber 54. This confined air will be compressed as the desired pressure is built up within the mold, and the air under this pressure will obviously be compressed into a fraction of the space which it previously occupied. If it should be found that there is too much air to be properly compressed, the dished portion 46$^a$ of the lower mold section 46 can be filled with water before the mold sections are assembled, thereby rendering the original air space within the mold smaller and decreasing the amount of air to be compressed. The water supply pipe 40 is provided with a suitable valve as in the previous instance, and this valve is closed when the proper amount of water has been introduced into the mold and the desired pressure built up therein.

In order to compensate for the expansion of the air and water when they are heated during the period of vulcanization, the mold is provided with an automatic water valve 19, which is mounted in a hollow protuberance 49 projecting within the dished portion 46$^a$ of the mold section 46. The construction and manner of operation of this automatic water valve 19 is exactly as previously described. If the pressure exceeds the amount for which the valve is set, the valve will automatically open and permit escape of a sufficient amount of water to relieve the excessive pressure and reduce the pressure to the proper degree.

The various forms of molds can be used in connection with any suitable and conventional form of vulcanizer pot, such as that shown by the McLeod Patent No. 1,213,224. A hydraulic ram of the general character shown in this patent may be used for forcing the molds together, and a number of the molds may be superposed on each other and connected in tandem so that they can all be filled with water at a single operation. In the form of mold shown by Fig. 1, the dished middle portions of the mold sections preferably extend outwardly flush with the bulged portions at the periphery of the mold sections, so that when a number of these molds are superposed on each other and subjected to the action of a hydraulic ram in the vulcanizer pot, the pressure will be distributed evenly over the molds and will not be concentrated at the peripheries thereof. It will, of course, be understood that where the molds are forced together by a hydraulic ram or similar contrivance, the use of bolts for fastening the mold sections together may be unnecessary.

While I have illustrated and described certain embodiments of my invention in detail, it will be understood that many modifications and changes can be made in the details of construction without departing from the spirit of the invention, and I do not wish to be understood as restricting myself to the exact constructions which have been shown on the drawings and described in the application for illustrative purposes.

Having thus described my invention, what I claim as new and desire to secure by Letters Patent, is:

1. A mold for vulcanizing rubber tires comprising complemental mold sections having outermost tire engaging portions for direct contact with the sides of a rubber tire for molding action thereon, said sections being comprised of solid plates including the said tire engaging portions and extending from the latter over the space encircled by a tire received between the sections, the central portions of the plates consisting of substantially flat parallel bodies at the outer portions of which the tire engaging portions are integrally formed, and said central portions being disposed at their outer faces in substantially the same plane as the outer sides of the tire engaging portions, so that the ram of the vulcanizing apparatus may exert pressure on both the outermost molding tire engaging portions and said central portions.

2. A mold for vulcanizing rubber tires comprising complemental opposed mold members, each formed at its outermost portion with a tire receiving and contacting part to provide one side of a mold chamber, and being in the form of a solid plate that extends over the central space surrounded by a tire seated in said mold chamber, and each plate having portions at the central part thereof projecting outward to the same plane as the outer side of the tire receiving part, whereby the ram of a vulcanizing apparatus may exert pressure on both the mold chamber and central outward projecting portions aforesaid, and whereby when the molds are assembled in the vulcanizing press the tire engaging parts and central outward projecting portions will be in contact with one another.

3. A vulcanizing mold for tires and like articles, including complemental mold sections adapted to be applied to the tire from opposite sides thereof, and having the form of solid plates which meet at the tread of the tire, the central portions of the mold sections being dished so that the outer surfaces thereof are substantially in the same plane as the outer surfaces of the tire engaging portions of the mold sections, and said portion in the same plane being unobstructed to enable molds to be assembled one upon the other with these portions flat against one another.

In testimony whereof I affix my signature.

LAURITS A. LAURSEN.